United States Patent [19]

Lonnborg et al.

[11] Patent Number: 4,921,071
[45] Date of Patent: May 1, 1990

[54] MARINE STERN DRIVE WITH IMPROVED FLUID INSPECTION RESERVOIR

[75] Inventors: Thomas S. Lonnborg; Gary L. Meisenburg, both of Fond du Lac, Wis.

[73] Assignee: Brunswick Corporation, Skokie, Ill.

[21] Appl. No.: 366,316

[22] Filed: Jun. 14, 1989

Related U.S. Application Data

[63] Continuation of Ser. No. 160,529, Feb. 26, 1988, abandoned.

[51] Int. Cl.⁵ .................................................. F01M 11/10
[52] U.S. Cl. .................................. 184/6.4; 137/845; 137/587; 220/203; 220/367; 184/45.1; 184/103.1; 184/105.1
[58] Field of Search .................. 184/45.1, 65, 88.1, 184/97, 96, 108, 103.1, 105.1, 6.21, 6.12; 440/88; 220/203, 206, 367; 137/854, 587, 526, 381, 377

[56] References Cited

U.S. PATENT DOCUMENTS

| | | | |
|---|---|---|---|
| 900,280 | 10/1908 | Hoffman | 184/65 X |
| 1,372,506 | 3/1921 | Hartley | 220/367 X |
| 2,261,032 | 10/1941 | Keller | 220/367 X |
| 3,064,668 | 11/1962 | Alkire et al. | 220/367 X |
| 3,335,817 | 8/1967 | Horning | 184/6.21 |
| 4,165,816 | 8/1979 | Tupper | 220/203 |
| 4,572,120 | 2/1986 | Matsumoto | 184/103.1 |
| 4,696,322 | 9/1987 | Knapp et al. | 137/854 |
| 4,805,663 | 2/1989 | Szlaga | 137/538 X |

FOREIGN PATENT DOCUMENTS 2042689 9/1980 United Kingdom ............... 137/854

Primary Examiner—Leonard E. Smith
Attorney, Agent, or Firm—Andrus, Sceales, Starke & Sawall, Robert C. Curfiss

[57] ABSTRACT

A transparent container (20, 48) is mounted to the inner transom wall (2) of a boat (3) and is connected to the oil passages in a stern drive unit (1). The container is provided with a removable cap (25) having a one-way valve (27) of the Vernay type therein. The valve prevents outward leakage of lubricant fluid from the container, but permits inward passage of air so that, during engine and drive unit cooling, lubricant can be sucked back into the system through the drive housings. The cap may be provided with a lubricant level warning device (41-43; 45-47) which extends downwardly into the container. In another embodiment, the warning device is spaced from the cap and extends upwardly into the container. In another embodiment, the container may be provided with a spring loaded diaphragm (53) which is movably responsive to the lubricant pressure within the stern drive unit.

9 Claims, 3 Drawing Sheets

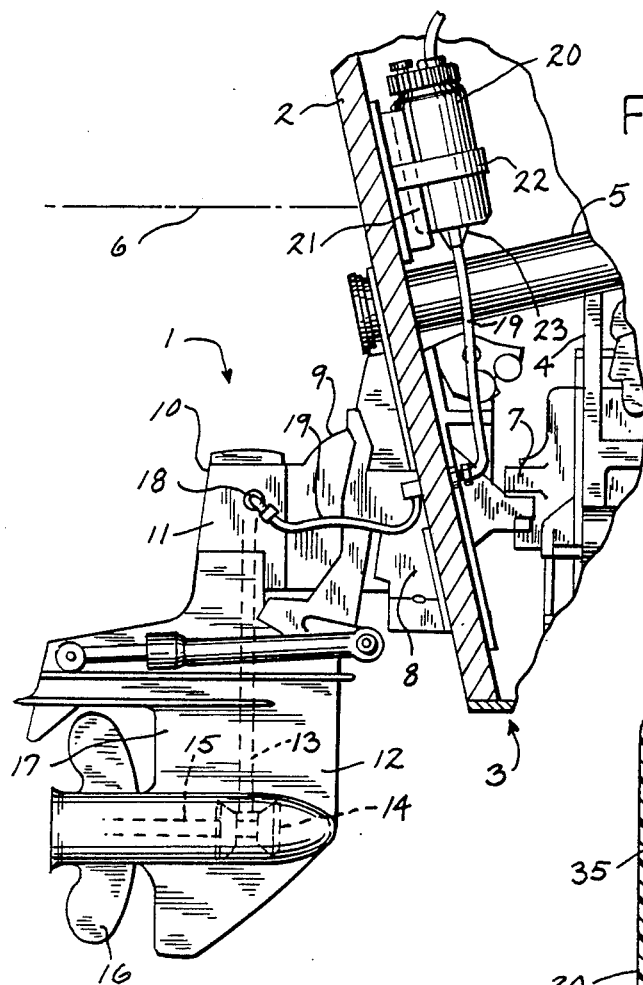
FIG. 1
FIG. 3
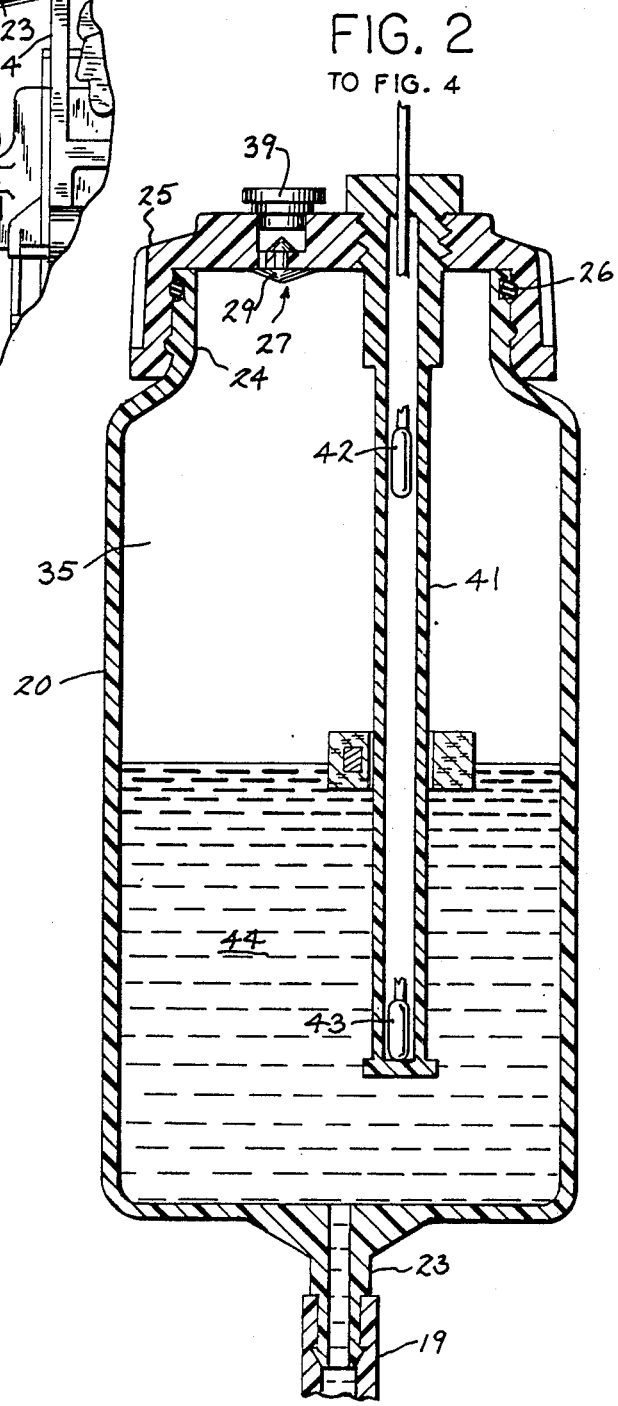
FIG. 2
TO FIG. 4

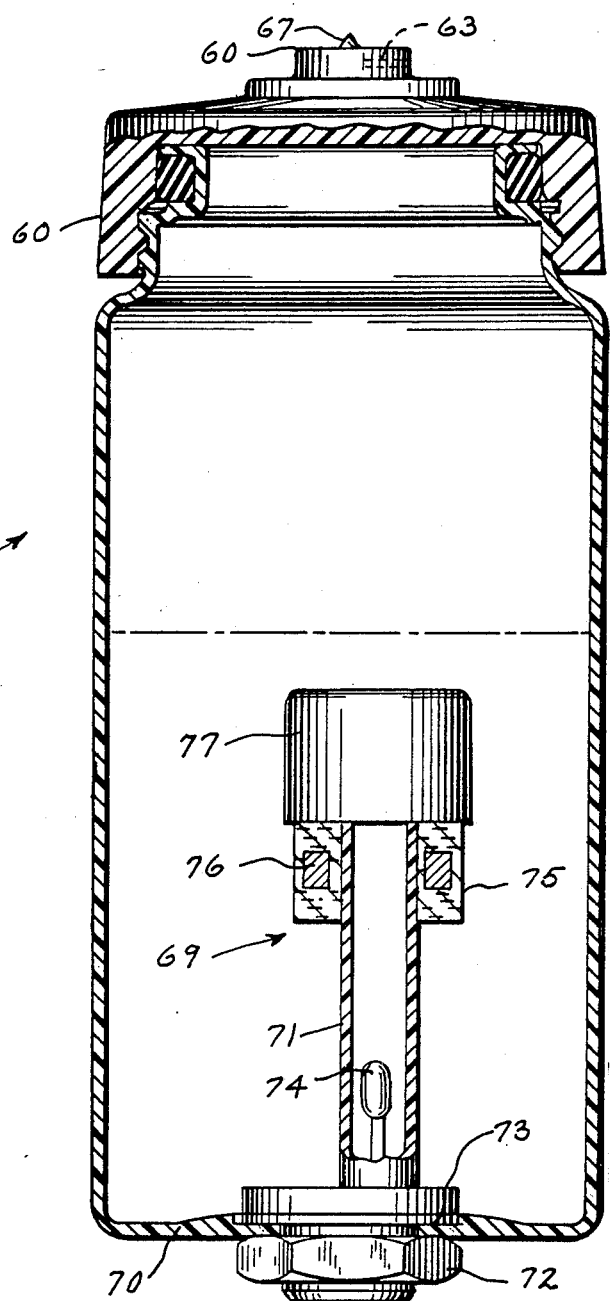
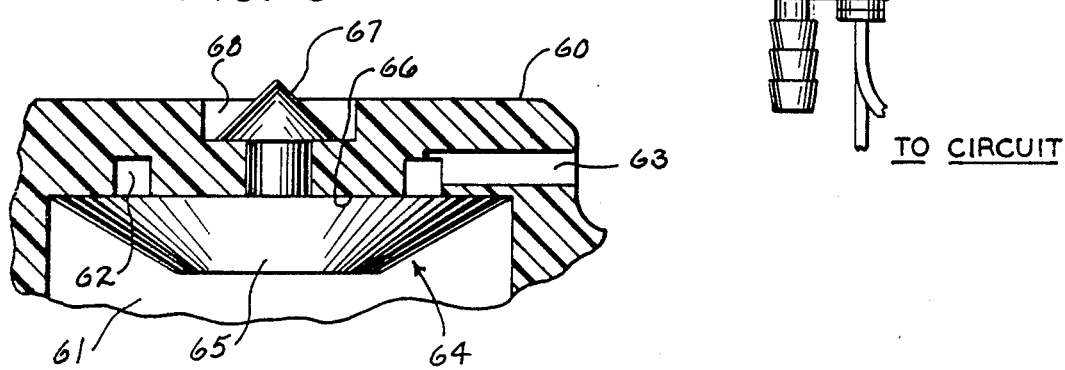
FIG. 7
FIG. 8

MARINE STERN DRIVE WITH IMPROVED FLUID INSPECTION RESERVOIR

This is a continuation of application Ser. No. 07/160,529, filed Feb. 26, 1988, now abandoned.

BACKGROUND AND SUMMARY OF THE INVENTION

This invention relates to a marine stern drive with an improved fluid inspection reservoir.

It is desired to provide a clear inspection reservoir inboard of a boat having a stern drive unit for easy observing of the level and condition of lubricating fluid within the unit.

Broadly, it is known to provide such a reservoir. See, for example, U.S. Pat. No. 3,335,817. In that patent, an underwater drive unit has a lubricant chamber 32 therein which is connected through the bottom 10 of a boat and to a clear inspection chamber 85 mounted within the boat and which is connected to the intake manifold of an inboard engine 12.

Reference is also made to the co-pending U.S. patent application Ser. No. 07/160,587, filed Feb. 26, 1988, by Gary L. Meisenburg et al, entitled "Marine Stern Drive With Through-Housing Lubrication System", and assigned to a common assignees. In that application, a transparent container is mounted to the inner transom wall of a boat and is solely connected to the oil passages in the stern drive unit. The container is provided with a removable cap having a one-way valve therein. The valve prevents outward leakage of lubricant fluid from the container, but permits inward passage of air so that, during engine and drive unit cooling, lubricant can be sucked back into the system through the drive housings.

It is an object of the present invention to provide various container concepts including: incorporating an improved one-way valve associated with the container, incorporating a device to provide a warning of low or high lubricant levels within the container, and incorporating a device within the container to effectively lower the lubricant pressure within the stern drive unit when the drive is running and hot.

In accordance with the various concepts of the invention, the removable cap of the transparent reservoir container is provided with a Vernay check valve of the one-way type, which provides enhanced reliability during both the running and at-rest conditions of the stern drive. The cap may be provided with an automatic lubricant level warning device which extends downwardly into the container. In another embodiment, the warning device is spaced from the cap and extends upwardly into the container. In yet another embodiment, the container may be provided with a spring loaded diaphragm which is movably responsive to the lubricant pressure within the stern drive unit.

BRIEF DESCRIPTION OF THE DRAWINGS

The accompanyinng drawings illustrate the best mode presently contemplated by the inventor for carrying out the invention.

In the drawings:

FIG. 1 is a schematic fragmentary side elevation of a marine stern drive system incorporating a transparent lubricant reservoir, with parts in section;

FIG. 2 is an enlarged central vertical section of the reservoir, and showing the cap having a one-way valve and a lubricant level warning device;

FIG. 3 is a further enlarged fragmentary showing of the mounted one-way valve;

FIG. 7 is a view generally similar to FIG. 2 of yet another embodiment of reservoir, and FIG. 8 is an enlarged view generally similar to FIG. 3 of another embodiment of valve arrangement.

DESCRIPTION OF THE PREFERRED EMBODIMENTS

Figure 4:
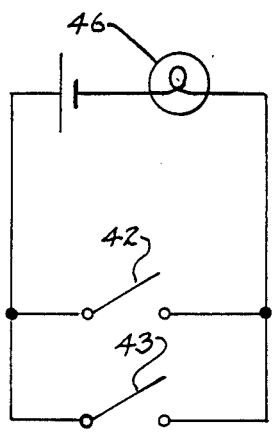
FIG. 4 schematically illustrates a schematic circuit for the warning device.

As shown in FIG. 1 of the drawings, the various aspects of the invention are incorporated in a marine stern drive unit 1 adapted to be mounted in any suitable well-known way to the transom 2 of a boat 3 having an inboard engine 4 which has an exhaust discharge 5 beneath the water level 6, and furthermore which has a suitable drive output 7. Stern drive unit 1 is connected to engine drive output 7, and includes an assemblage of a gimbal housing 8, a bell housing 9 and also a drive shaft housing 10 with the latter forming an upper gear case 11 and a lower gear case 12. Housings 8, 9 and 10 contain the usual well-known working parts of stern drive unit 1.

Engine drive output 7 connects via suitable connected shafts and gearing through housings 8, 9 and 10, with drive shaft housing 10 having a vertical drive shaft 13 therewithin which connects through the usual gearing 14 to a horizontal shaft 15 to which is mounted a propeller 16.

An oil chamber 17 is formed within drive shaft housing 10 for lubricating the working parts therein. Chamber 17 is connected from a port 18 in housing 10, and thru a hose 19 passing through transom 2 to a transparent bottle-like generally enclosed reservoir container 20. Container 20 is mounted inboardly on transom 2, as by a base 21 and strap 22. In the embodiment of FIG. 1, the bottom of container 20 is provided with a suitable fitting 23 to which hose 19 is connected.

As best shown in FIG. 2, the upper end of container 20 has a relatively wide mouth 24 and is threaded to removably receive a threaded cap 25 thereon. An annular O-ring 26 is mounted to container 20 to provide a seal with cap 25.

A one-way check valve 27 is mounted to cap 25 to prevent outward leakage of lubricant fluid from the container, but permits inward passage of air so that, during engine and drive unit cooling, lubricant can be sucked back into oil chamber 17. Vacuum is relieved in the oil chamber so that water is prevented from leaking past the involved seals. In accordance with certain aspects of the invention, valve 27 is of the umbrella check type and includes a resilient body having a central stem 28. An enlarged umbrella-shaped sealing member 29 having a planar inner flat face 30 is disposed on one end of stem 28. A stop member 31 of smaller dimensions and having an annular planar surface 32 thereon is disposed on the other stem end. A pair of adjacent passages 33 and 34 are formed in cap 25 and connect between a working chamber 35 formed within container 20 and an enlarged chamber 36 formed by a recessed portion of cap 25.

Passage 33 serves as a mounting hole means for check valve 27, which is forced through the hole so that face 30 of sealing member 29 seals against the inner cap wall 37, and so that stop member 31 retains valve 27 in place.

Passage 34 serves as a fluid connector means between working chamber 35 and cap chamber 36. The construction is such that check valve sealing member 29 normally closes the inner end of passage 34.

A plug 39 is mounted, as by a press fit, into the walls of cap member 36 to basically close the latter, with the exception of a vent hole 40 in the plug which communicates between the atmosphere and cap chamber 36.

When the marine drive unit 1 is operating, with resultant lubricant pressure in the system, member 29 of check valve 27 blocks passage 34 to thus maintain container 20 solely in communication with oil chamber 17. When drive unit 1 is shut down with resultant cooling of the lubricating fluid, air is permitted to be sucked back through vent 40, cap member 36, passage 34 and between sealing member 29 and wall 37, and hence into container chamber 35 and toward oil chamber 17.

In accordance with another aspect of the invention, and in the embodiment shown in FIGS. 2 and 4, lubricant level detection means are associated with cap 25 to automatically advise the boater when attention should be given to particular levels of lubricant in the overall system. For this purpose, an elongated probe 41 is threaded into cap 25 and extends downwardly into container chamber 35. Probe 41 is shown as hollow and contains a plurality of normally open switches, in this case, a switch 42 disposed at the upper probe end, and a further switch 43 disposed at the lower probe end. The respective switch positioning is generally in accordance with undesirably high or low levels of lubricant 44 within container 20.

Switches 42 and 43 are connected in an electrical circuit 45 (FIG. 4) containing an alarm device 46, which may be a visually observable light or an audible horn or the like.

An actuator means, such as a float 47, is responsive to the level of lubricant 44. Float 47 is shown as encircling probe 41 and rides up and down thereon. The material of switches 42,43 and float 47 is such that when the latter approaches either switch, the switch is caused to be closed, thus closing the circuit of FIG. 4 to energize warning device 46 to bring an undesirable high or low lubricant level condition to the attention of the boater, so that appropriate action can be taken. When float 47 is between switches 42 and 43, the latter are open, but the particular lubricant level can always be visually observed through the transparent walls of container 20. The condition of the lubricant, such as excess air containment or the like, can also be continuously visually monitored.

In accordance with a further aspect of the invention, means are provided to permit expanding lubricant fluid and possibly air mixed therewith to, during running of the drive, expand into the reservoir container from unit 1; with a resultant effective lowering of the running drive pressure. The results are such as to help prevent system seal leakage and improve seal life; and to reduce overall oil temperature by reducing churning thereof.

Figure 5:
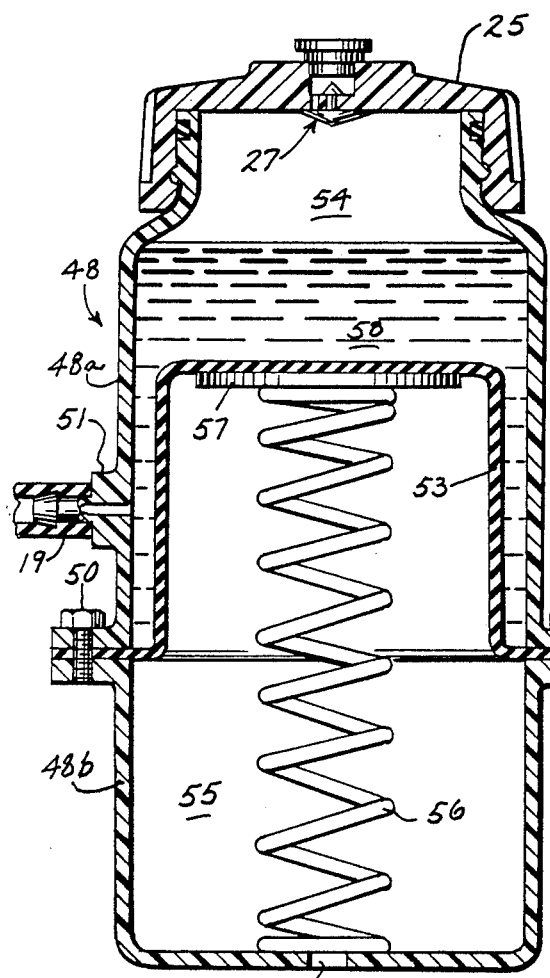
FIG. 5 is a central vertical section of another embodiment of reservoir having a movable diaphragm therein which is positioned during cold conditions.
Figure 6:
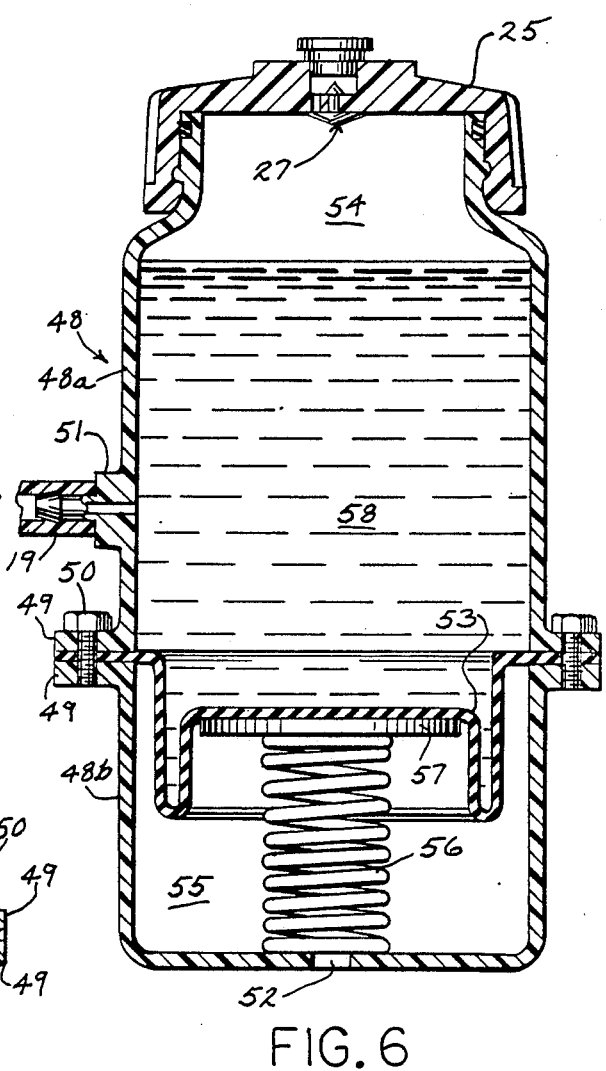
FIG. 6 is a view similar to FIG. 5 during hot conditions.

As shown in FIGS. 5 and 6, a container 48 is formed of an upper section 48a and a lower section 48b, with the sections being flanged as at 49 and joined together by bolts 50 or any other suitable means. In this embodiment, a fitting 51 in the side wall of upper section 48a, above flanges 49, is joined to hose 19. Furthermore, an aperture 52 is disposed in the bottom of lower section 48b and is open to the atmosphere.

Container 48 may be provided with a cap 25 and check valve 27 similar to those previously described.

A resilient diaphragm 53 is mounted at its edges between flanges 49 and separates container 48 into an upper chamber 54 and a lower chamber 55. Diaphragm 53 is of the spring loaded "rolling" type, and a biasing spring 56 is confined between the bottom of lower container section 48b and a disc-like support plate 57 engaging the central lower side of diaphragm 53. Plate 57 is of less diameter than the diameter of container 48 and diaphragm 53.

Upper chamber 54 communicates with drive shaft housing 10 through hose 19 and thus is adapted to contain lubricating fluid 58 from the stern drive system; while lower chamber 55 communicates through aperture 52 to the outside, and thus is adapted to contain air. Diaphragm 53 serves as a barrier between the lubricant and air.

When stern drive unit 1 is not operating and the system is cool or cooling, as in FIG. %, lubricant 58 has contracted and spring 56 biases plate 57 and diaphragm 53 upwardly. Air enters aperture 52, thus expanding chamber 55; while lubricant discharges through fitting 51 into hose 19, thus contracting chamber 54. When stern drive unit 1 goes into operation and the system becomes hot, as in FIG. 6, expanding lubricant 58 is forced into container 48 through fitting 51 and diaphragm 53 is displaced downwardly against the force of spring 56. The result is to enlarge chamber 54 and contract chamber 55. The enlargement of chamber 54 results in a lowering of the drive pressure of the lubricant within the entire system, including at fitting 51, due to the expanded storage volume available.

In addition, when the speed of stern drive unit 1 is reduced during running, the usual splash lubrication often used in such systems is reduced, and spring 56 will move from a position as in FIG. 6 and toward the FIG. 5 position. This will assist in maintaining the system full of lubricant at all times.

FIGS. 7 and 8 illustrate yet another, and perhaps preferred, embodiment. In this embodiment, a transparent container 59 for lubricant is provided with a threadably removable cap 60 which in this instance need not require a plug, such as 39 in FIGS. 1–3. In this case, cap 60 is provided with a central thru-passage 61 and an annular concentric recess or groove 62 on its inner face. A vent passage 63 extends through the body of cap 60 between groove 62 and the outside atmosphere. An umbrella check valve 64 is mounted in passage 61 with its large sealing member 65 sealing against the inner cap wall 66 and covering groove 62, and its stop member 67 restng against an annular outer recess 68 in the outer cap wall.

In addition, and as shown in FIG. 7, a warning device 69 is spaced from cap 60 and extends upwardly through the bottom wall 70 of container 59. Device 69 comprises a hollow probe or stem 71 which extends through and is suitably sealingly secured to bottom wall 70, as at least in part by a threaded leaking nut 72 and sealing washer 73. A suitable switch 74, which may be of the reed type and connected to a circuit generally similar to FIG. 4, is fixedly disposed at a selected level within stem 71. A float 75 carries a magnetic ring 76 which surrounds stem 71 for sliding thereon. A fluid dampening cap 77 may be secured to stem 71 above float 75 if desired.

The device shown in FIG. 7 shows a low level warning system. That is, when the lubricant level drops and float 75 lowers until ring 76 is adjacent switch 74, the magnetic field from ring 76 causes switch 74 to close. The connections and result are generally similar to that shown in FIG. 4, wherein an alarm 46 is actuated.

Various modes of carrying out the invention are contemplated as being within the scope of the accompanying claims which particularly point out and distinctly claim the subject matter regarded as the invention.

I claim:

1. For use with a marine stern drive mounted to the transom (2) of a boat (3), and with said stern drive having a lubricant-filled drive shaft housing (10) visual lubricant inspection means adapted for mounting inboard of a boat and in fluid communication with a connected drive shaft housing, said inspection means comprising, in combination:
   (a) a transparent reservoir forming a lubricant-receiving chamber,
   (b) means for fluidly connecting said reservoir to the drive shaft housing of a stern drive,
   (c) lubricant level detecting means (74–76) supported in said reservoir for automatically warning of the existence of an undesirable level of lubricant within said reservoir,
   (d) a removable cap (60) mounted to said reservoir, and with said cap having a central through passage (61), an inner wall (66) and an outer cap wall,
   (e) an annular recess (62) disposed on said inner wall,
   (f) a vent passage (63) extending transversely outwardly through said cap and communicating between said annular recess and the atmosphere,
   (g) a further recess (68) disposed in said outer cap wall,
   (h) and a one-way umbrella check valve (64) mounted in said through passage (61),
   (i) said umbrella check valve having a large sealing member (65) sealing against said inner wall (66) and covering said annular recess (62),
   (j) and said umbrella check valve having a stop member (67) resting against said further recess (68) in said outer cap wall,
   (k) said umbrella check valve providing means to prevent air discharge from said lubricant-receiving chamber and outwardly through said annular recess (62) and said transverse vent passage (63) during running of a connected stern drive, while permitting air inflow through said transverse vent passage and annular recess to said lubricant-receiving chamber when a connected stern drive is at rest.

2. For use with a marine stern drive mounted to the transom (2) of a boat (3), and with said stern drive having a lubricant-filled drive shaft housing (10), visual lubricant inspection means adapted for mounting inboard of a boat and in fluid communication with a connected drive shaft housing, said inspection means comprising, in combination:
   (a) a transparent reservoir forming a lubricant-receiving chamber,
   (b) means for fluidly connecting said reservoir to the drive shaft housing of a stern drive,
   (c) lubricant level detection means (74–76) supported in said reservoir for automatically warning of the existence of an undesirable level of lubricant within said reservoir, said detecting means including:
      (1) an elongated probe-like stem (71) spaced from said cap (60) and extending upwardly within said lubricant-receiving chamber of said reservoir, said reservoir having a bottom wall (70) to which said stem is sealingly secured,
      (2) float means (75) on said stem for moving therealong in response to the lubricant level within said chamber,
      (3) switch means (74) disposed on said probe and with said switch means being actuatable in response to a position of said float means,
      (4) and alarm means (46) actuatable in response to actuation of said switch means,
   (d) a removable cap (60) mounted to said reservoir, and with said cap having a central through passage (61), an inner wall (66) and an outer cap wall,
   (e) an annular recess (62) disposed on said inner wall,
   (f) a vent passage (63) extending transversely outwardly through said cap and communicating between said annular recess and the atmosphere,
   (g) a further recess (68) disposed in said outer cap wall,
   (h) and a one-way umbrella check valve (64) mounted in said through passage (61),
   (i) said umbrella check valve having a large sealing member (65) sealing against said inner wall (66) and covering said annular recess (62),
   (j) and said umbrella check valve having a stop member (67) resting against said further recess (68) in said outer cap wall,
   (k) said umbrella check valve providing means to prevent air discharge from said lubricant-receiving chamber and outwardly through said annular recess (62) and said transverse vent passage (63) during running of a connected stern drive, while permitting air inflow through said transverse vent passage and annular recess to said lubricant-receiving chamber when a connected stern drive is at rest.

3. For use with a marine stern drive mounted in the transom (2) of a boat (3), and with said stern drive having a lubricant-filled drive shaft housing (10), visual lubricant inspection means adapted for mounting inboard of a boat and in fluid communication with a connected drive shaft housing, said inspection means comprising, in combination:
   (a) a transparent reservoir (20, 48) forming a lubricant-receiving chamber (34, 54),
   (b) means (23, 51) for fluidly connecting said reservoir to the drive shaft housing of a stern drive,
   (c) and means (52–56) in said reservoir to lower the pressure of lubricant at said connecting means during running of a connected stern drive.

4. The combination of claim 3
   (a) in which said reservoir (48) has a side wall (48a, 48b) and a bottom wall,
   (b) in which said connecting means (b) is disposed in said side wall (48a),
   (c) and which includes an aperture (52) disposed in said bottom wall and providing communication between the interior of said reservoir and the atmosphere,
   (d) and a spring loaded resilient diaphragm (53) dividing the interior of said reservoir into:
      (1) said lubricant-receiving chamber (54),
      (2) and a second chamber (55) containing said aperture, (e) the construction being such as to provide means to lower the pressure of lubricant at said connecting means during running of a connected stern drive.

5. For use with a marine stern drive mounted to the transom (2) of a boat (3), and with said stern drive having a lubricant-filled drive shaft housing (10), visual lubricant inspection means adapted for mounting inboard of a boat and in fluid communication with a connected drive shaft housing, said inspection means comprising, in combination:
 (a) a transparent reservoir (20, 48) forming a lubricant-receiving chamber (35, 54),
 (b) means (23, 51) for fluidly connecting said reservoir to the drive shaft housing of a stern drive,
 (c) a removable cap (25) mounted to said reservoir,
 (d) a recess (36) formed in said cap and defining opposed inner cap and recess walls (37, 38) respectively,
 (e) a plug (39) mounted within said recess,
 (f) vent means (40) disposed in said plug and adapted to provide communication between the atmosphere and said recess,
 (g) a passage (34) in said cap and adapted to provide communication between said recess and said lubricant-receiving chamber,
 (h) and a one-way umbrella check valve (27) disposed in said cap between said recess and said lubricant-receiving chamber and disposed adjacent said passage,
 (i) said check valve providing means to prevent air discharge outwardly through said passage and vent during running of a connected stern drive, while permitting air inflow through said passage and vent when a connected stern drive is at rest.

6. The combination of claim 5 which includes: means (52-56) in said reservoir (48) to lower the pressure of lubricant at said connecting means (b) during running of a connected stern drive.

7. The combination of claim 5:
 (a) in which said reservoir (48) has a side wall (48a, 48b) and a bottom wall,
 (b) in which said connecting means (b) is disposed in said side wall (48a),
 (c) and which includes an aperture (52) disposed in said bottom wall and providing communication between the interior of said reservoir and the atmosphere,
 (d) and a spring loaded resilient diaphragm (53) dividing the interior of said reservoir into:
  (1) said lubricant-receiving chamber (54),
  (2) and a second chamber (55) containing said aperture,
 (e) the construction being such as to provide means to lower the pressure of lubricant at said connecting means during running of a connected stern drive.

8. The combination of claim 5 which includes: lubricant level detecting means (41-43; 45-47) connected to said cap (25) for automatically warning of the existence of an undesirable level of lubricant within said reservoir (20).

9. The combination of claim 8 in which said detecting means includes:
 (a) an elongated probe (41) mounted to said cap (25) and extending downwardly within said lubricant-receiving chamber (35) of said reservoir,
 (b) float means (47) on said probe for moving therealong in accordance with the lubricant level within said chamber,
 (c) switch means (42, 43) disposed on said probe and with said switch means being actuatable in response to a position of said float means,
 (d) and alarm means (46) actuatable in response to actuation of said switch means.

* * * * *